United States Patent [19]

Rosswurm et al.

[11] Patent Number: 4,649,537
[45] Date of Patent: Mar. 10, 1987

[54] RANDOM PATTERN LOCK AND KEY FAULT DETECTION SCHEME FOR MICROPROCESSOR SYSTEMS

[75] Inventors: Mark A. Rosswurm, Jackson Township, Allen County; Leland L. Kessler, Lima, both of Ohio

[73] Assignee: Westinghouse Electric Corp., Pittsburgh, Pa.

[21] Appl. No.: 663,526

[22] Filed: Oct. 22, 1984

[51] Int. Cl.⁴ ............................................. G06F 11/04
[52] U.S. Cl. ........................................ 371/16; 371/62; 361/62
[58] Field of Search ................ 371/25, 12, 16, 21, 371/15, 48, 62, 61, 66, 20; 364/200 MS File, 900 MS File; 361/62, 67, 86

[56] References Cited

U.S. PATENT DOCUMENTS

| | | | |
|---|---|---|---|
| 4,263,647 | 4/1981 | Merrell | 371/48 |
| 4,409,635 | 10/1983 | Kraus | 361/62 |
| 4,410,938 | 10/1983 | Higashiyama | 371/62 |
| 4,433,413 | 2/1984 | Fasang | 371/25 |
| 4,519,090 | 5/1985 | Stackhouse | 371/62 |
| 4,538,273 | 8/1985 | Lasser | 371/62 |

OTHER PUBLICATIONS

Carnes, M. L. et al., "Processor Checking", IBM Tech. Discl. Bulletin, vol. 17, No. 11, Apr. 1975.
Tomas, W. M. et al., "Automatic Lay-Out Analysis," IBM Tech. Discl. Bulletin, vol. 10, No. 10, Mar. 1968.

Primary Examiner—Michael R. Fleming
Attorney, Agent, or Firm—R. P. Lenart

[57] ABSTRACT

A microprocessor-based electronic control unit utilizes a random pattern lock and key failure detection scheme to detect failures in the system being controlled or the control unit itself. The microprocessor system is programmed to receive a random data word, to output the same data word, and to perform a variety of tests which result in the generation of a data stream having a particular relationship to the random data word such that the data stream and the random data word bits can be combined to form a predetermined data word that is needed to maintain microprocessor control of the associated electrical system. If the microprocessor fails to generate a data stream which results in the formation of the proper predetermined data word, the control unit output will be locked into a predetermined state.

16 Claims, 6 Drawing Figures

RANDOM PATTERN LOCK AND KEY FAULT DETECTION SCHEME FOR MICROPROCESSOR SYSTEMS

BACKGROUND OF THE INVENTION

This invention relates to electrical control systems and more particularly to fault detection schemes for microprocessor systems.

When a failure in an electrical system has the potential to expose life or property to extreme danger, it is essential that the system be closely controlled. Any failure in the system or the control unit should result in immediate corrective action. Various design techniques are available when designing an electrical system which contains highly reliable control functions. These techniques include backup logic circuits, voting schemes, and special data processing techniques.

It is important that microprocessor systems used in critical control applications incorporate some means of detecting microprocessor and peripheral failures to prevent damage from a failed system. Failure detection schemes are used to force system outputs to predetermined states or to prevent any change in the system output state after detection of a failure. It is desirable to implement a failure detection scheme that adequately tests the microprocessor and at the same time does not add an unnecessary hardware or software burden to the controlled system.

U.S. Pat. No. 4,409,635, issued Oct. 11, 1983 to Kraus, discloses a microprocessor failure detection scheme. The scheme of that patent requires the microprocessor to read a fixed pattern read-only-memory (ROM) to initiate self-test routines. The resultant self-test data is fed to a comparator along with the correct output from the self-test ROM. If the microprocessor data output matches the ROM output, the comparator outputs a logic one. A correct output toggles a monostable one shot to increment a binary counter that selects another self-test routine from the ROM to be performed by the microprocessor. While the microprocessor is executing the self-test, the comparator output is zero since the previously latched data does not equal the new ROM data. When the system is operating normally, the comparator output is a square wave. This square wave is then amplified, filtered and rectified to enable an AND gate which permits microprocessor control of the system. If any part of the microprocessor system fails, the square wave from the comparator is lost and the microprocessor loses control of the system. The disclosure of U.S. Pat. No. 4,409,635 is hereby incorporated by reference.

Although the described prior art failure detection scheme adequately tests the microprocessor system and removes control of the system upon a failure, the hardware and overhead associated with the scheme is excessive. That circuit requires a dedicated read-only-memory, a comparator, a monostable pulse generator, a binary counter, an amplifier, a bandpass filter and a full wave rectifier to implement the failure detection scheme. It is therefore desirable to develop a fault detection scheme which can be implemented with a smaller number of hardware components.

SUMMARY OF THE INVENTION

The present invention utilizes a random pattern lock and key technique to achieve a fault detection scheme in a microprocessor based control system. An electronic control unit constructed in accordance with the present invention includes a storage device for receiving a random data word and a data processor adapted to read the random data word from the storage device and to restore the random data word to the storage device. The data processor also conducts a series of self tests which result in the generation of a data stream having a particular relationship to the random data word such that the data stream and random data word bits can be combined to form a predetermined data word that is needed to maintain processor control of an associated electrical system. If the processor fails to generate a data stream which results in the formation of the proper predetermined data word, the control unit will be locked into a predetermined state.

The control units of this invention are advantageously used in an electrical power system which includes a plurality of generators and contactors. These contactors are connected in series with the outputs of the generators and a plurality of power buses. The control units are used to control the operation of the contactors and to drive the contactors to a predetermined state in the absence of the proper predetermined data word.

DESCRIPTION OF THE PREFERRED EMBODIMENTS

Figure 1:
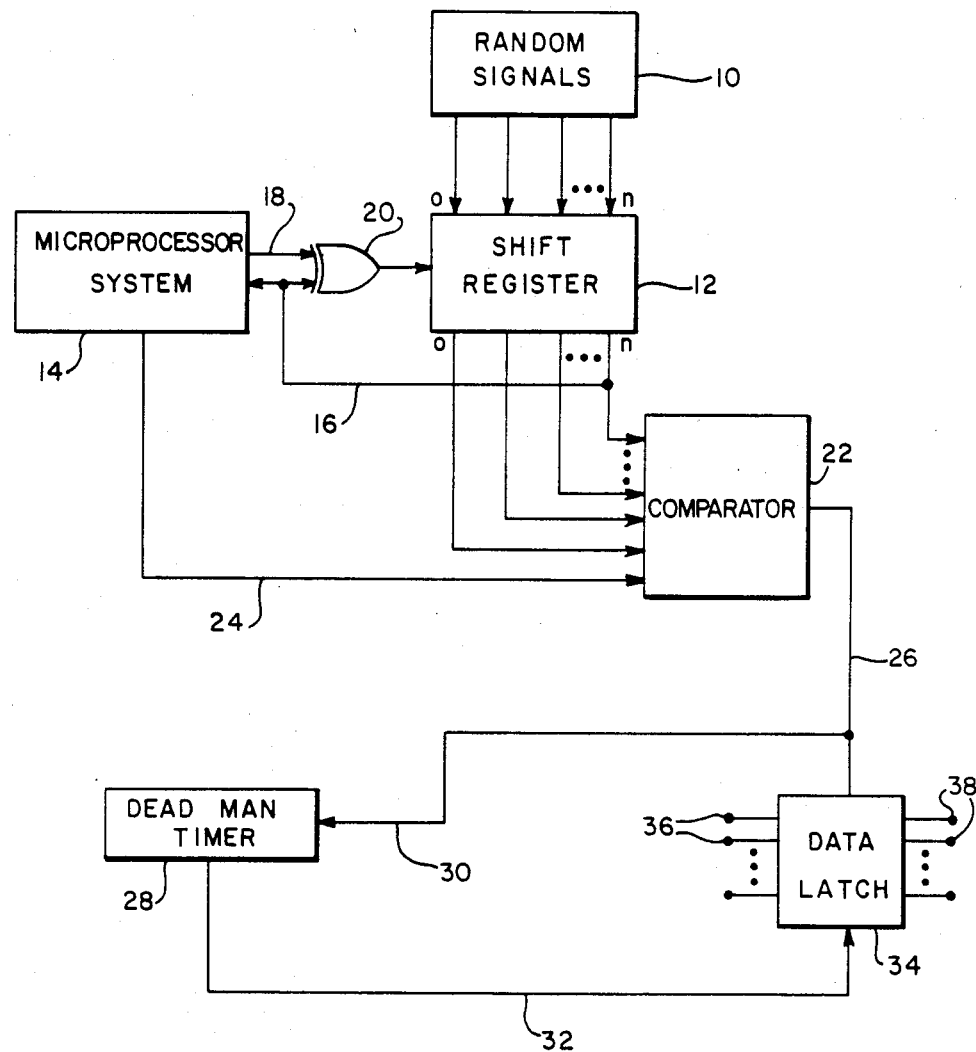
FIG. 1 is a logic diagram of a control unit constructed in accordance with one embodiment of the present invention.

Referring to the drawings, FIG. 1 is a logic diagram of an electronic control unit constructed in accordance with one embodiment of the present invention. Existing random signals 10 serve as inputs for generating a random data word having a plurality of bits. This random data word is then stored in a shift register 12. A microprocessor system 14 serves as the system data processor and is connected to read the random data word stored in the shift register 12 by way of data line 16. After reading the data word, the microprocessor system 14 outputs the same random data word on data line 18 in order to restore the random data word to the shift register 12. Then the microprocessor system conducts a series of self-tests and subsequently outputs a first data word on data line 18 wherein the first data word has a particular relationship to the random data word. Exclusive OR gate 20 serves as a means for combining the first data word with the random data word. The first data word is related to the random data word such that a predetermined second data word is formed on the outputs of shift register 12. Upon completion of the microprocessor system self-test routines, the second data word is fed to the inputs of comparator 22 and a strobe output is produced by the microprocessor system on data line 24. If the second data word is correct, the comparator outputs an unlock signal on data line 26. A dead man timer 28 receives the unlock signal on data line 30 and maintains a predetermined logic level on data line 32 when the time between successive unlock signals does not exceed a preselected failure time. The unlock signal is fed to a data latch 34 which serves as a means for controlling the associated electrical system by way of input and output lines 36 and 38, respectively. Data latch 34 may comprise an interface circuit such as found in FIGS. 4, 5 and 6 of U.S. Pat. No. 4,409,635.

A unique feature of the control units of the present invention is that a random pattern, with respect to the microprocessor system clock, is used as the combination required to unlock the lock. The use of a random pattern insures that the microprocessor is operational since a fixed key data word, that is, the first data word, will not consistently unlock the lock and change the system state. The dead man timer 28 is included so that the failure to generate consecutive unlock signals will result in an inhibit signal on data line 32 to prevent data latch 34 from accepting new data. It should be noted that the random pattern scheme can be implemented in hardware with only two common integrated circuits.

Figure 2:
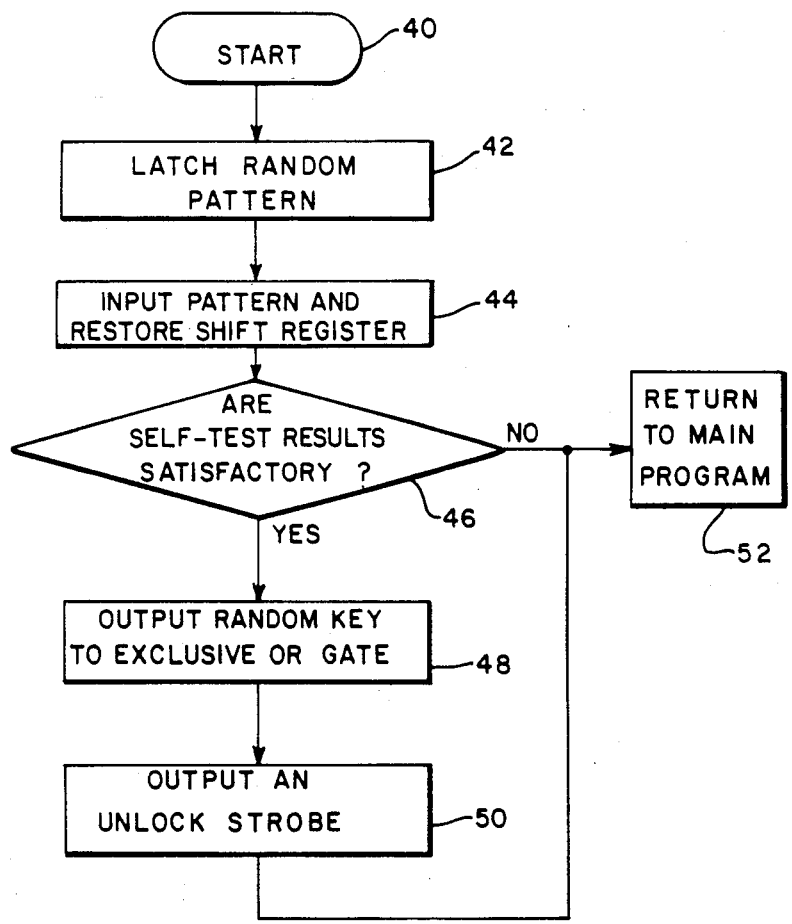
FIG. 2 is a flow diagram which illustrates the operation of the control unit of this invention.

FIG. 2 is a flow chart which illustrates the operation of the circuit of FIG. 1. Starting at block 40 to initialize the lock routine, the random pattern inputs are latched into the shift register as shown in block 42 with the exclusive OR gate 20 set for uncomplemented data. Block 44 shows that the random data word from the shift register is read by the microprocessor system while at the same time it is restored to the shift register by way of data line 18 as it is being read. The microprocessor system then conducts a series of self-test routines and outputs a first data word and clock stream to the shift register. The microprocessor system software determines for each bit of the output pattern whether the data to the shift register input needs to be complemented or left unchanged by the exclusive OR gate in order to shift a logic one to the first stage output. In the preferred embodiment, if the stored data bit was zero, the exclusive OR input on data line 18 is set to logic one so that the first stage data is complemented and thus the output of the shift register will be set equal to one after a clock pulse. If the stored data bit was a logic one, the exclusive OR input on data line 18 is set to zero so that the first stage data remains the same and a logic one is clocked into the first stage. Each bit of the stored random data is thus analyzed and the first data word appears as a data stream produced on data line 18 by the microprocessor system. Each bit of this first data word is adjusted so that the input to the shift register is changed to an appropriate value and all logic ones are shifted into the shift register. This series of logic ones then represents a predetermined second data word which is used to subsequently generate the unlock signal. If the microprocessor system is working correctly as shown in block 46 of FIG. 2, then the algorithm will result in the shift register being filled by all logic ones and the comparator 22 will be enabled.

If all the additional self-tests performed during the previous program cycle indicate proper operation of the other microprocessor components, the proper second data word, which in this case is all logic ones, is delivered to the comparator 22 as shown in block 48 of FIG. 2 and an unlock strobe pulse is produced by the microprocessor as shown in block 50 of FIG. 2. If the microprocessor has read the original random pattern, restored that random pattern to the register, then produced an appropriate random key as a serial data stream which ultimately fills the register with all ones, an unlock signal will be generated. This unlock signal will allow the system state to be entered into a data latch and used for system control. If all of the above conditions have not been met, the lock remains closed, the system status cannot be changed, and the dead man timer does not receive a reset pulse. Then the dead man timer times out and inhibits the data latch from accepting any further unlock signals.

Figure 3:
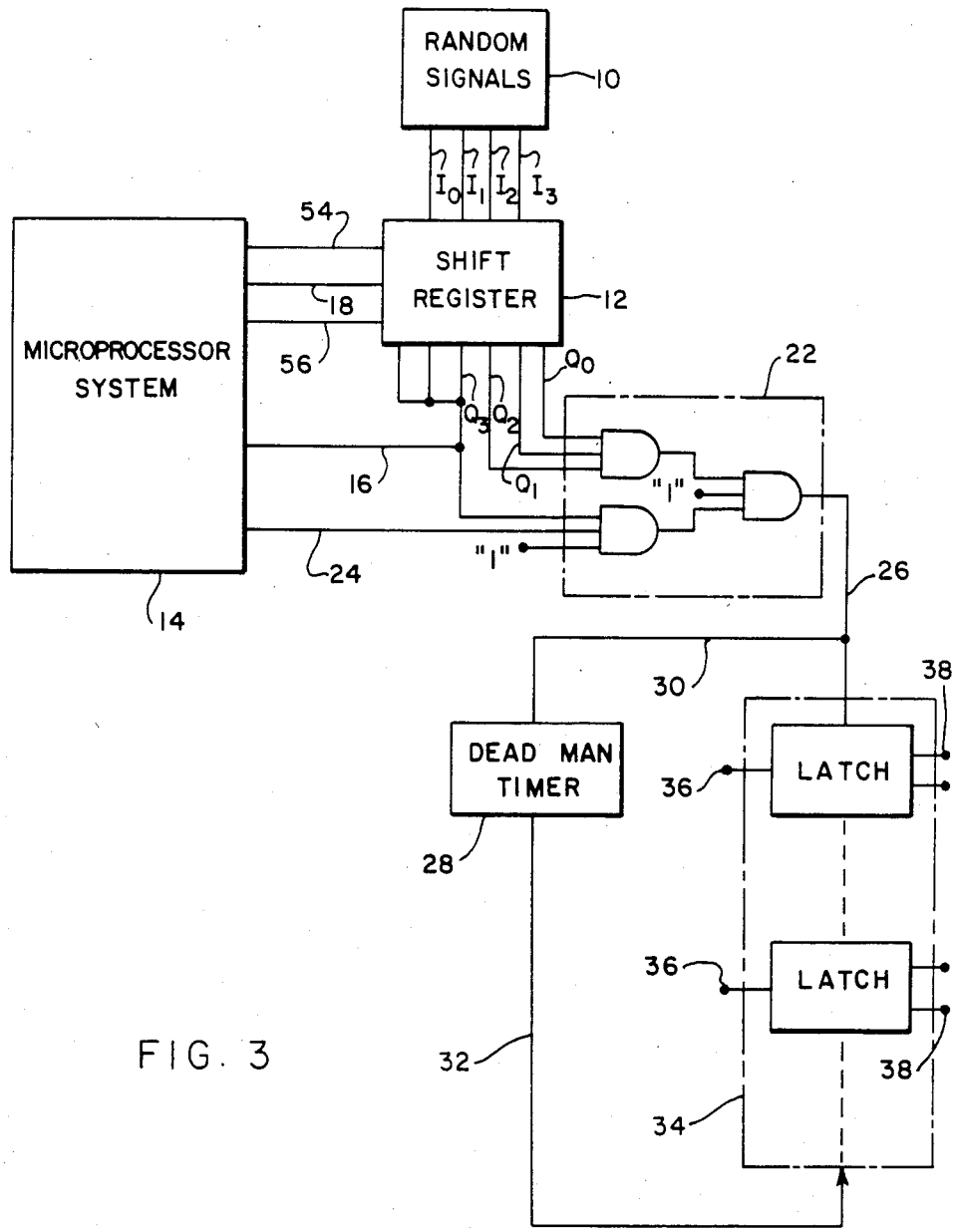
FIG. 3 is a schematic diagram of a 4-bit control unit constructed in accordance with this invention.

FIG. 3 is a schematic diagram of the preferred embodiment of the present invention for a 4-bit random pattern. Only two integrated circuits are required to implement the lock and key part of the fault detector scheme. In operation, random data is latched into a 4035 shift register 12 by means of a parallel/serial input data line 54. The microprocessor system reads the random data pattern in the shift register by clocking the shift register on data line 56 while inputting data from output $Q_3$ of the shift register. An internal exclusive OR gate for the $Q_3$ output is set for uncomplemented data by setting a true/complement input signal on data line 18 equal to a logic one. This allows the random pattern to be shifted back to the shift register unchanged.

Once the pattern has been read, the microprocessor program checks bit 3 of the stored pattern and outputs an uncomplemented signal to the true/complement input of the shift register. Since the XOR'd $Q_3$ output of the shift register is fed back to the serial input of the register, the XOR'd bit 3 data will result in a logic one being shifted to the output of the first shift register stage. Bit 2 of the stored data pattern is then checked and the output is again set to the true/complement input of the shift register before the clock pulse is outputted. Bits 1 and 0 are processed in the same manner.

If the microprocessor system is working correctly, at the end of the key word data stream, the shift register will be filled with all ones. Note that if the original random pattern has not been shifted back to the shift register correctly after having been read, the exclusive OR and shift algorithm will not fill the shift register with all ones. Therefore the shift register output will not be equal to the proper second data word. Note also that if the data to the true/complement input of the shift register remains high or low, the shift register will not be all ones at the end of the routine.

The shift register outputs are connected to the inputs of a 4073 AND gate comparator 22. After the microprocessor completes the shift register fill, an unlock strobe is sent to comparator 22 on data line 24 if all other self tests executed during the previous program cycle indicate no failure.

If the microprocessor was successful in filling the shift register with all ones, the unlock strobe will generate an unlock signal on data line 26. This unlock signal is used by the latch 34 to input new system data and to reset the dead man timer 28. If the unlock signal is not generated, the system status remains the same and the dead man timer times out to indicate a failure. The dead man timer is also used as an input to the latch so that a microprocessor failure will prevent any further changes in the data latch.

Figure 4:
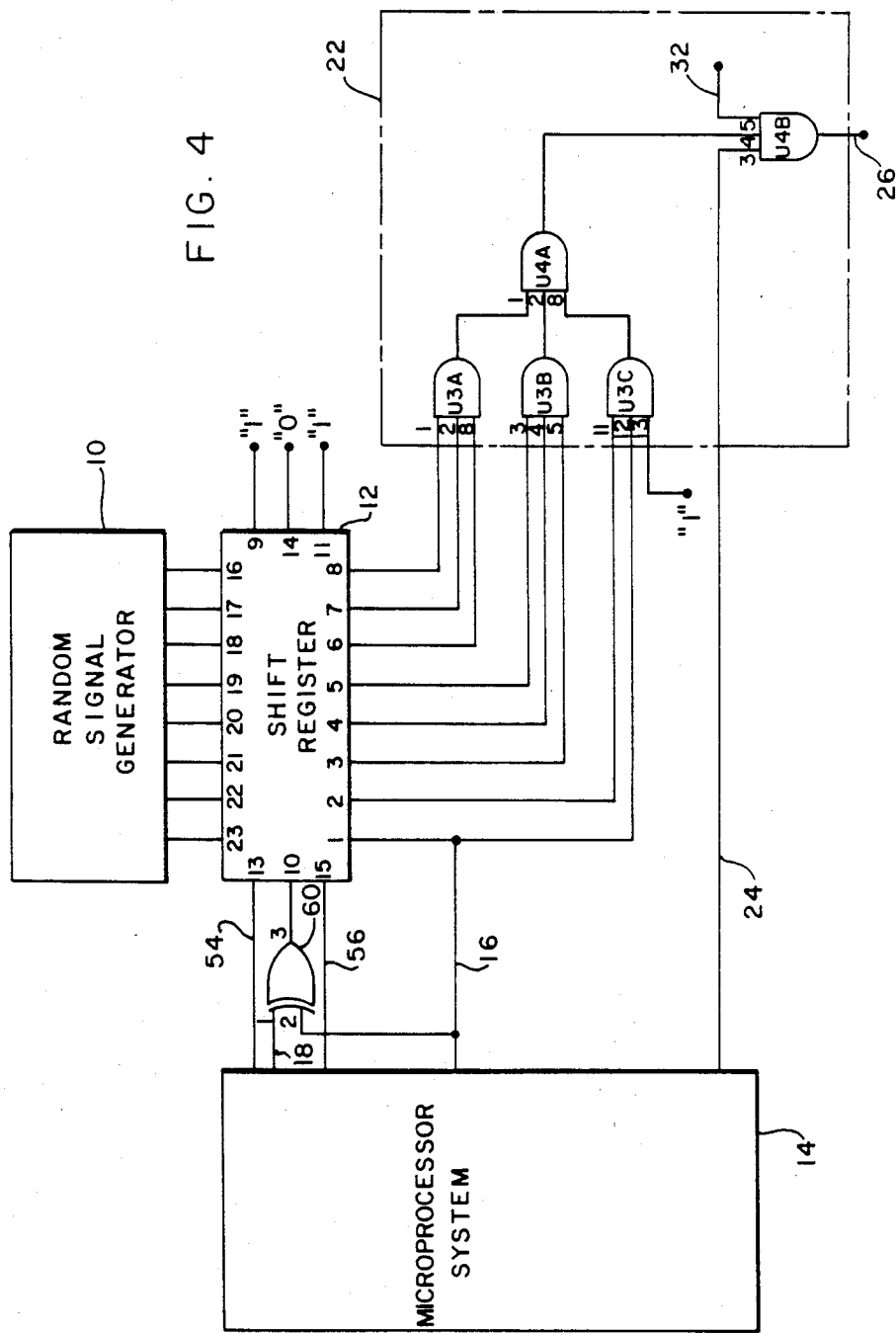
FIG. 4 is a schematic diagram of an 8-bit control unit constructed in accordance with this invention.

FIG. 4 is a schematic diagram of the preferred embodiment of the present invention for an 8-bit random pattern. This circuit uses a 4034 shift register 12, a 4070 exclusive OR gate 60 and two 4073 AND networks for the comparator.

Figure 5:
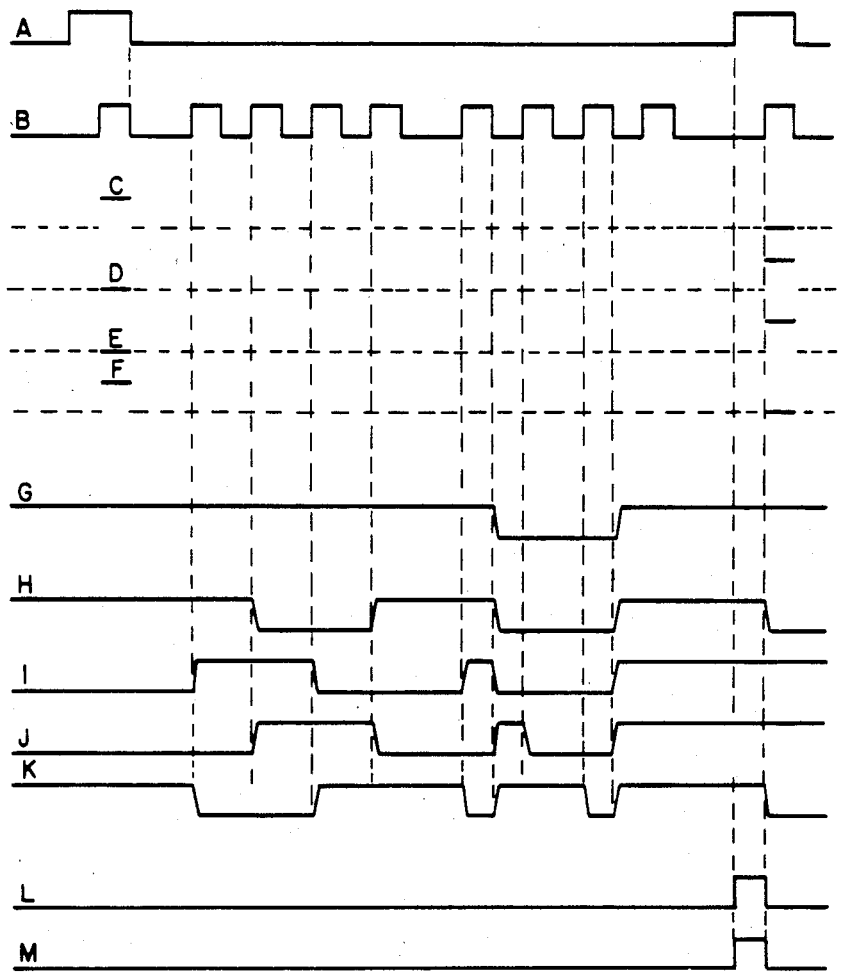
FIG. 5 is a series of waveforms which illustrate the operation of the circuit of FIG. 3.

FIG. 5 is a series of waveforms which illustrate the operation of the control unit illustrated by the schematic diagram of FIG. 3. Waveform A is a data signal occurring on the parallel/serial input data line 54 of the shift register. Waveform B represents the clock signal on data line 56. Waveforms C, D, E and F are the input data bits $I_0$, $I_1$, $I_2$ and $I_3$ respectively. The true/complement input on data line 18 is represented by waveform G. Waveforms H, I, J and K represent the shift register outputs $Q_0$, $Q_1$, $Q_2$ and $Q_3$, respectively. The strobe output on data line 24 is represented by waveform L and waveform M represents the unlock output on data line 26.

Figure 6:
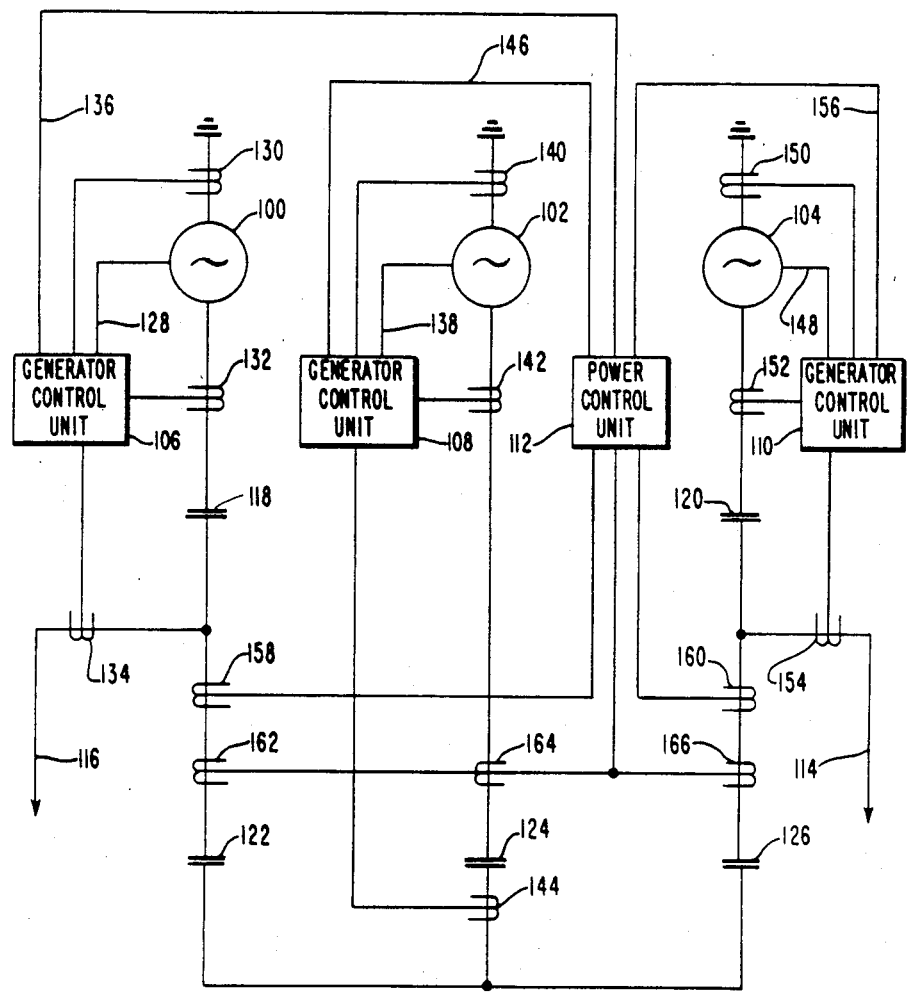
FIG. 6 is a schematic diagram of an electrical power system which includes the control unit of the present invention.

FIG. 6 shows a one-line diagram of an electrical power system which includes control units constructed in accordance with the present invention. This power system includes three independent generators 100, 102 and 104. Generator control units 106, 108 and 110 and bus power control unit 112 monitor the system and insure that power is delivered to the right bus 114 and left bus 116 under normal conditions and when in a single circuit failure occurs.

Contactors 118, 120 and 124 are normally closed while contactors 122 and 126 are normally open. Therefore under normal conditions, generator 100 supplies power to the left bus 116 and generator 104 supplies power to the right bus 114.

Each control unit of FIG. 6 is constructed in accordance with FIG. 1. Control unit 106 monitors the performance of generator 100 via data line 128. It also monitors the wiring between ground and the left bus 116 by comparing the current measured by current transformers 130, 132 and 134. If the parameters on data line 128 reveal a failure in generator 100; the current measured by current transformers 130, 132 and 134 is not uniform, indicating a wiring failure; or the self-test routine of control unit 106 discovers a failure in control unit 106; then control unit 106 will lock into an output state which will open contactor 118 and inform control unit 112 via data line 136 that a fault has occurred. Control unit 112 would respond by closing contactor 122 so that generator 102 supplies power to the left bus 116.

Control unit 108 will monitor the function of generator 102 via data line 138. The wiring between ground and the left bus 116 will be monitored by control unit 108 by measuring the current with current transformers 140, 142 and 144. A failure in generator 102, its associated wiring, or control unit 108 would result in contactor 124 being opened and control unit 112 being informed of the failure via data line 146.

Control unit 110 performs functions similar to those of control unit 106, but for circuits associated with the right bus 114. The function of generator 104 is monitored via data line 148 and the wiring between ground and the right bus 114 is monitored via current transformers 150, 152 and 154. A failure in generator 104, the associated wiring, or control unit 110 would result in contactor 120 being locked open and control unit 112 being informed of the failure via data line 156. Control unit 112 would respond by closing contactor 126 so that generator 102 can supply power to the right bus 114.

Control unit 112 monitors current via current transformers 158 and 160 to determine if contactor 122 or 126 is closed. Current transformers 162, 164 and 166 are monitored simultaneously and wired such that any failure in bus wiring between them will produce a signal at control unit 112 indicating that corrective action is necessary.

Although the present invention has been described in terms of what are at present believed to be its preferred embodiments, it will be apparent to those skilled in the art that various changes may be made without departing from the scope of the invention. For example, the predetermined output of the shift register can be any preselected data word. It is only necessary that the key data word produced by the microprocessor is related to the random data word in a manner such that the correct shift register output is produced. It is therefore intended that the appended claims cover all such changes.

We claim:

1. An electronic control unit comprising:
   storage means having an input for receiving a random data word having a plurality of bits;
   a data processor having an input for receiving said random data word from said storage means and having an output;
   said data processor being adapted to read said random data word in said storage means and to restore said random data word to said storage means;
   said data processor being further adapted to conduct a series of self-tests and to subsequently output a first data word having a particular relationship to said random data word;
   means for combining said first data word with said random data word to produce a predetermined second data word when said data processor is operating properly; and
   means for producing an unlock signal in response to the production of said predetermined second data word.

2. An electronic control unit as recited in claim 1, wherein corresponding bits in said first data word and said random data word are related such that for each bit in said random data word which is at a first logic level, the corresponding bit in said first data word is at the same logic level and for each data bit in said random data word which is at a second logic level, the corresponding bit in said first data word is at the complementary logic level.

3. An electronic control circuit as recited in claim 1, wherein said data processor includes a strobe output and said data processor is adapted to produce a strobe pulse on said strobe output following the completion of a series of said self-tests.

4. An electronic control unit as recited in claim 1, further comprising:
   means for disabling said unlock signal when said predetermined second data word is not produced within a preselected time following the reading of said random data word by said data processor.

5. An electronic control unit as recited in claim 4, wherein said disabling means is a dead man timer.

6. An electronic control unit as recited in claim 1, wherein said storage means is a shift register.

7. An electronic control unit as recited in claim 6, wherein said means for combining is an exclusive OR gate.

8. An electronic control unit as recited in claim 7, wherein said means for producing an unlock signal is an AND gate.

9. An electrical power system having an electronic control unit comprising:
   a plurality of generators;

a plurality of contactors individually connected in series with the outputs of said generators and a plurality of power buses;

storage means having an input for receiving a random data word having a plurality of bits;

a data processor having an input for receiving said random data word from said storage means and having an output;

said data processor being adapted to read said random data word in said storage means and to restore said random data word to said storage means;

said data processor being further adapted to conduct a series of self-tests and to subsequently output a first data word having a particular relationship to said random data word;

means for combining said first data word with said random data word to produce a predetermined second data word when said data processor is operating properly;

means for producing an unlock signal in response to the production of said predetermined second data word; and means responsive to said unlock signal for controlling said contactors and for driving said contactors to a predetermined state in the absence of said unlock signal.

10. An electrical power system as recited in claim 9, wherein corresponding bits in said first data word and said random data word are related such that for each bit in said random data word which is at a first logic level, the corresponding bit in said first data word is at the same logic level and for each data bit in said random data word which is at a second logic level, the corresponding bit in said first data word is at the complementary logic level.

11. An electrical power system as recited in claim 9, wherein said data processor includes a strobe output and said data processor is adapted to produce a strobe pulse on said strobe output following the successful completion of said self-tests.

12. An electrical power system as recited in claim 9, further comprising:

means for disabling said unlock signal when said predetermined second data word is not produced within a preselected time following the reading of said random data word by said data processor.

13. An electrical power system as recited in claim 12, wherein said disabling means is a dead man timer.

14. An electrical power system as recited in claim 13, wherein said storage means is a shift register.

15. An electrical power system as recited in claim 14, wherein said means for combining is an exclusive OR gate.

16. An electrical power system as recited in claim 15, wherein said means for producing an unlock signal is an AND gate.

* * * * *